US007821964B2

(12) United States Patent
Ayyagari et al.

(10) Patent No.: US 7,821,964 B2
(45) Date of Patent: Oct. 26, 2010

(54) METHODS AND SYSTEMS FOR NETWORK COORDINATION

(75) Inventors: Deepak Ayyagari, Vancouver, WA (US); Wai-Chung Chan, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1506 days.

(21) Appl. No.: 11/089,882

(22) Filed: Mar. 23, 2005

(65) Prior Publication Data

US 2005/0169222 A1    Aug. 4, 2005

Related U.S. Application Data

(63) Continuation of application No. PCT/US2004/036797, filed on Nov. 5, 2004.

(60) Provisional application No. 60/518,036, filed on Nov. 7, 2003, provisional application No. 60/518,224, filed on Nov. 7, 2003, provisional application No. 60/518,237, filed on Nov. 7, 2003, provisional application No. 60/518,574, filed on Nov. 7, 2003, provisional application No. 60/537,492, filed on Jan. 19, 2004, provisional application No. 60/573,353, filed on May 21, 2004.

(51) Int. Cl.
*H04L 12/28* (2006.01)
(52) U.S. Cl. .................. 370/254; 370/338; 370/410; 370/431; 709/220; 455/446; 455/507
(58) Field of Classification Search ............... None
See application file for complete search history.

(56) References Cited

U.S. PATENT DOCUMENTS

| 4,313,212 | A |   | 1/1982  | Witlock              |
|-----------|---|---|---------|----------------------|
| 5,402,413 | A | * | 3/1995  | Dixon ......... 370/335 |
| 5,495,483 | A |   | 2/1996  | Grube et al.         |
| 5,541,955 | A |   | 7/1996  | Jacobsmeyer          |
| 5,596,439 | A |   | 1/1997  | Dankberg et al.      |
| 5,644,573 | A |   | 7/1997  | Bingham et al.       |
| 5,794,157 | A | * | 8/1998  | Haartsen ......... 455/522 |
| 5,828,963 | A |   | 10/1998 | Grandhi et al.       |
| 5,949,769 | A |   | 9/1999  | Davidson et al.      |

(Continued)

FOREIGN PATENT DOCUMENTS

JP    05-304530    11/1993

(Continued)

OTHER PUBLICATIONS

U.S. Appl. No. 11/098,623 Office Action dated Aug. 15, 2008.

(Continued)

*Primary Examiner*—Daniel J Ryman
*Assistant Examiner*—Brian Roberts
(74) *Attorney, Agent, or Firm*—Krieger Intellectual Property, Inc.; Scott C. Krieger

(57) ABSTRACT

Aspects of the present invention relate to distributed network coordination and administration. Some aspects relate to network coordination and management using an interfering network list that may be maintained by a network controlling authority. Some aspects relate to allocation of specific bandwidth segments by a network controlling authority to avoid network collisions and improve network efficiency.

14 Claims, 7 Drawing Sheets

U.S. PATENT DOCUMENTS

| | | | |
|---|---|---|---|
| 6,006,271 | A | 12/1999 | Grabiec et al. |
| 6,038,455 | A * | 3/2000 | Gardner et al. ............. 455/447 |
| 6,084,886 | A | 7/2000 | Dehner et al. |
| 6,097,700 | A | 8/2000 | Thornberg et al. |
| 6,167,095 | A | 12/2000 | Furukawa et al. |
| 6,233,240 | B1 | 5/2001 | Barbas et al. |
| 6,278,723 | B1 * | 8/2001 | Meihofer et al. ............ 375/133 |
| 6,278,883 | B1 | 8/2001 | Choi |
| 6,400,819 | B1 | 6/2002 | Nakano et al. |
| 6,408,033 | B1 | 6/2002 | Chow et al. |
| 6,480,506 | B1 | 11/2002 | Gubbi |
| 7,180,884 | B2 | 7/2003 | Elliott |
| 6,618,366 | B1 | 9/2003 | Furukawa et al. |
| 6,668,175 | B1 | 12/2003 | Almgren et al. |
| 6,674,750 | B1 | 1/2004 | Castellano |
| 6,700,875 | B1 | 3/2004 | Schroeder et al. |
| 6,718,393 | B1 | 4/2004 | Aditya |
| 6,741,554 | B2 | 5/2004 | D'Amico et al. |
| 6,754,176 | B1 | 6/2004 | Gubbi et al. |
| 6,763,384 | B1 | 7/2004 | Gupta et al. |
| 6,795,418 | B2 | 9/2004 | Choi |
| 6,826,186 | B1 | 11/2004 | Ditta et al. |
| 6,850,981 | B1 | 2/2005 | Ho et al. |
| 6,865,609 | B1 | 3/2005 | Gubbi et al. |
| 6,877,043 | B2 | 4/2005 | Mallory et al. |
| 6,891,841 | B2 | 5/2005 | Leatherbury et al. |
| 6,934,554 | B2 * | 8/2005 | Mizuno et al. ............. 455/502 |
| 6,934,752 | B1 | 8/2005 | Gubbi |
| 6,947,748 | B2 | 9/2005 | Li et al. |
| 6,980,810 | B1 * | 12/2005 | Gerakoulis et al. .......... 455/450 |
| 7,050,452 | B2 | 5/2006 | Sugar et al. |
| 7,072,315 | B1 | 7/2006 | Liu et al. |
| 7,076,220 | B2 * | 7/2006 | Backes et al. ............ 455/161.1 |
| 7,110,366 | B2 * | 9/2006 | Hulyalkar et al. .......... 370/252 |
| 7,110,380 | B2 | 9/2006 | Shvodian |
| 7,151,558 | B1 | 12/2006 | Kogane et al. |
| 7,233,991 | B2 | 6/2007 | Adhikari |
| 7,269,185 | B2 | 9/2007 | Kirkby et al. |
| 7,295,518 | B1 | 11/2007 | Monk et al. |
| 7,298,289 | B1 | 11/2007 | Hoffberg |
| 7,315,573 | B2 | 1/2008 | Lusky et al. |
| 7,561,539 | B2 | 7/2009 | Sugaya |
| 2001/0037412 | A1 | 11/2001 | Miloushev et al. |
| 2002/0022483 | A1 | 2/2002 | Thompson et al. |
| 2002/0062472 | A1 | 5/2002 | Medlock et al. |
| 2002/0094011 | A1 | 7/2002 | Okumura et al. |
| 2002/0133589 | A1 | 9/2002 | Gubbi et al. |
| 2002/0137467 | A1 | 9/2002 | Tzannes |
| 2002/0159418 | A1 * | 10/2002 | Rudnick et al. ............. 370/338 |
| 2002/0163928 | A1 * | 11/2002 | Rudnick et al. ............. 370/444 |
| 2003/0002529 | A1 | 1/2003 | Kurdzinski et al. |
| 2003/0012166 | A1 | 1/2003 | Benveniste |
| 2003/0012167 | A1 * | 1/2003 | Benveniste ................. 370/338 |
| 2003/0012176 | A1 | 1/2003 | Kondylis et al. |
| 2003/0016732 | A1 | 1/2003 | Miklos et al. |
| 2003/0040319 | A1 * | 2/2003 | Hansen et al. ............. 455/452 |
| 2003/0067892 | A1 * | 4/2003 | Beyer et al. ................. 370/328 |
| 2003/0081603 | A1 | 5/2003 | Rune |
| 2003/0084283 | A1 | 5/2003 | Pixton |
| 2003/0126536 | A1 | 7/2003 | Gollamudi et al. |
| 2003/0147368 | A1 | 8/2003 | Eitan et al. |
| 2003/0161268 | A1 | 8/2003 | Larsson et al. |
| 2003/0161340 | A1 | 8/2003 | Sherman |
| 2003/0169697 | A1 | 9/2003 | Suzuki |
| 2003/0174665 | A1 | 9/2003 | Benveniste |
| 2003/0181165 | A1 | 9/2003 | Sugar et al. |
| 2003/0199279 | A1 | 10/2003 | Roberts |
| 2003/0224787 | A1 | 12/2003 | Gandolfo |
| 2003/0231621 | A1 | 12/2003 | Gubbi et al. |
| 2003/0231715 | A1 | 12/2003 | Shoemake et al. |
| 2004/0001429 | A1 | 1/2004 | Ma et al. |
| 2004/0013102 | A1 | 1/2004 | Fong et al. |
| 2004/0013135 | A1 | 1/2004 | Haddad |
| 2004/0022181 | A1 | 2/2004 | Coffey |
| 2004/0053621 | A1 | 3/2004 | Sugaya |
| 2004/0058686 | A1 | 3/2004 | Odman |
| 2004/0062229 | A1 | 4/2004 | Ayyagari et al. |
| 2004/0066738 | A1 | 4/2004 | Stopler |
| 2004/0100897 | A1 | 5/2004 | Shattil |
| 2004/0125786 | A1 | 7/2004 | Fuchs |
| 2004/0136393 | A1 | 7/2004 | Insua et al. |
| 2004/0166869 | A1 | 8/2004 | Laroia et al. |
| 2004/0184398 | A1 | 9/2004 | Walton et al. |
| 2004/0224634 | A1 | 11/2004 | Kim |
| 2004/0224676 | A1 | 11/2004 | Iseki |
| 2005/0030890 | A1 | 2/2005 | Benco et al. |
| 2005/0030967 | A1 | 2/2005 | Ohmi |
| 2005/0192037 | A1 * | 9/2005 | Nanda et al. ................. 455/509 |
| 2006/0039275 | A1 | 2/2006 | Walton et al. |
| 2006/0114826 | A1 | 6/2006 | Brommer |
| 2006/0227706 | A1 | 10/2006 | Burst, Jr. |
| 2006/0250973 | A1 | 11/2006 | Trott |
| 2006/0251098 | A1 | 11/2006 | Morioka |
| 2007/0211786 | A1 | 9/2007 | Shattil |
| 2008/0039148 | A1 | 2/2008 | Rudolf |

FOREIGN PATENT DOCUMENTS

| | | |
|---|---|---|
| JP | 11-205352 | 7/1999 |
| JP | 2000-165930 | 6/2000 |
| JP | 2004-503181 | 1/2002 |
| JP | 2004-537875 | 6/2002 |
| JP | 2003-110571 | 4/2003 |
| JP | 2003-249936 | 9/2003 |
| WO | WO00/74322 | 12/2000 |
| WO | WO02/41586 | 5/2002 |

OTHER PUBLICATIONS

U.S. Appl. No. 11/89,626 Office Action dated Feb. 2, 2009.
U.S. Appl. No. 11/089,629 Office Action dated Jul. 23, 2008.
U.S. Appl. No. 11/089,629 Office Action dated Jan. 16, 2009.
U.S. Appl. No. 11/089,759 Office Action dated Aug. 4, 2008.
U.S. Appl. No. 11/089,759 Office Action dated Jan. 26, 2009.
U.S. Appl. No. 11/089,756 Office Action dated Jul. 21, 2008.
U.S. Appl. No. 11/089,756 Office Action dated Dec. 24, 2008.
U.S. Appl. No. 11/090,549 Office Action dated Jul. 10, 2008.
U.S. Appl. No. 11/90,549 Office Action dated Jan. 5, 2009.
International Application No. PCT/US04/036797 International Search Report.
International Application No. PCT/US04/036797 International Preliminary Examination Report.
International Application No. PCT/US04/036798 International Search Report.
International Application No. PCT/US04/036799 International Preliminary Examination Report.
International Application No. PCT/US04/036799 International Search Report.
International Application No. PCT/US04/036786 International Preliminary Examination Report.
International Application No. PCT/US04/036786 International Search Report.
International Application No. PCT/US04/036796 International Preliminary Examination Report.
International Application No. PCT/US04/036796 International Search Report.
International Application No. PCT/US04/036969 International Preliminary Examination Report.
International Application No. PCT/US04/036969 International Search Report.
International Application No. PCT/US04/036785 International Preliminary Examination Report.
International Application No. PCT/US04/036785 International Search Report A.

International Application No. PCT/US04/036785 International Search Report B.

U.S. Appl. No. 11/089,792—Office Action dated Feb. 21, 2006.

U.S. Appl. No. 11/089,792—Office Action dated Mar. 28, 2006.

U.S. Appl. No. 11/089,792—Office Action dated Nov. 6, 2006.

U.S. Appl. No. 11/089,792—Office Action dated Apr. 25, 2007.

U.S. Appl. No. 11/089,792—Office Action dated Aug. 8, 2007.

U.S. Appl. No. 11/090,549—Office Action dated Dec. 12, 2007.

International Application No. PCT/US04/036798 International Preliminary Examination Report (Previously cited incorrectly in the Information Diclosure Statement dated Jun. 2, 2008.).

European Search Report for PCT/US 2004036797 corresponding to U.S. Appl. No. 11/089,882 which has technical similarities to the present application.

Japanese Office Action JP2007-503890 corresponding to U.S. Appl. No. 11/089,759 which has technical similarities to the present application.

Japanese Office Action JP2007-527184 corresponding to U.S. Appl. No. 11/089,756 which has technical similarities to the present application.

Japanese Office Action JP2006-538487 corresponding to U.S. Appl. No. 11/089,792 which has technical similarities to the present application.

Decision of Rejection for JP2006-538487 corresponding to U.S. Appl. No. 11/089,792 which has technical similarities to the present application.

U.S. Appl. No. 11/089,623—Non-Final Office Action dated Feb. 2, 2009 (Previously cited incorrectly in the Information Disclosure Statement dated Jun. 2, 2009.).

U.S. Appl. No. 11/089,623—Non-Final Office Action dated Mar. 16, 2010.

U.S. Appl. No. 11/089,756—Notice of Allowance dated May 27, 2010.

U.S. Appl. No. 11/089,623—Office Action dated Sep. 17, 2009.

U.S. Appl. No. 11/089,792—Notice of Allowance dated Jan. 28, 2008.

U.S. Appl. No. 11/089,756—Office Action dated Sep. 10, 2009.

U.S. Appl. No. 11/090,549—Office Action dated Dec. 30, 2009.

U.S. Appl. No. 11/090,549 Office Action dated Jul. 7, 2009.

U.S. Appl. No. 11/089,759—Notice of Allowance dated Oct. 8, 2009.

European Search Report for PCT/US 2004036785 corresponding to U.S. Appl. No. 11/089,629 which has technical similarities to the present application.

Japanese Office Action JP 2006-538485 corresponding to U.S. Appl. No. 11/090,549 which has technical similarities to the present application.

* cited by examiner

METHODS AND SYSTEMS FOR NETWORK COORDINATION

CROSS-REFERENCE TO RELATED APPLICATIONS

This application is a continuation of International Patent Application No. PCT/US2004/36797 filed on Nov. 5, 2004 which claims the benefit of U.S. Provisional Patent Applications: No. 60/518,036 filed Nov. 7, 2003 entitled "OFDMA (FDM+TDM) Schedulers for OFDM PHY's"; No. 60/518,036 60/518,224 filed Nov. 7, 2003 entitled "Reconfiguration of Sub-Channels in an OFDM System"; No. 60/518,237 filed Nov. 7, 2003 entitled "Network Bandwidth Optimization For Channel Estimation Measurements"; No. 60/518,574 filed Nov. 7, 2003 entitled "Selection Of Fixed Versus Dynamic Modulation Settings In An OFDM System"; No. 60/537,492 filed Jan. 19, 2004 entitled "Resource Coordination Architecture For Neighboring Networks"; and No. 60/573,353 filed May 21, 2004 entitled "System Design Document For Neighbor Network Operations."

BACKGROUND OF THE INVENTION

In situations where multiple logical networks share a common communication medium or channel, the networks compete for access to the channel. Typically, the networks will compete for bandwidth. In the absence of any coordination between the networks, they can destructively interfere with one another, reducing capacity utilization and reducing the bandwidth (BW) available to devices within a network.

It is also often imperative for security reasons and other concerns, that the devices within one network not be able to access and interpret the message exchanges within another network. This is usually accomplished through security keys that encrypt messages. These keys are usually unique to the network and are not shared with other logical networks.

The scenario described above may arise when neighboring homes in a residential neighborhood or apartment complex deploy local area networks within their individual dwellings. Often these networks share a channel as is the case in wireless and in powerline networks. An acceptable implementation of this scenario requires systems and methods that allow multiple networks to coordinate with one another without compromising the security of any individual network.

BRIEF SUMMARY OF THE INVENTION

Embodiments of the present invention comprise methods and systems for coordination among multiple interfering networks.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF PREFERRED EMBODIMENTS

Figure 1:
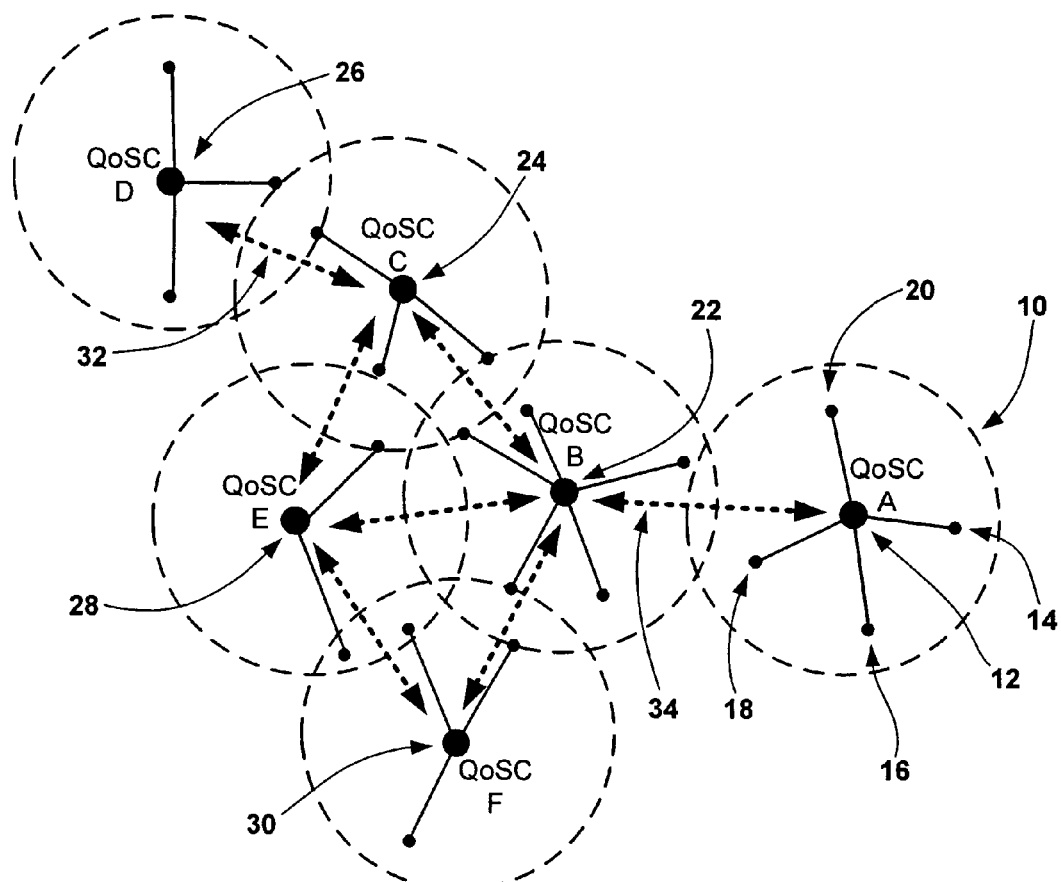
FIG. 1 illustrates an exemplary network scenario.

Some channel-sharing or media-sharing network coordination problems may be solved by contention access protocols that are employed by all devices in the multiple networks sharing a channel or medium. Often these protocols require the deciphering of parts of the transmitted messages which can undermine the security of individual networks. Quality of Service (QoS) is a term that refers to systems and methods for establishing priorities among network devices. Contention access protocols have been shown to be inefficient in providing QoS guarantees to Audio-Visual (AV) and streaming applications, which are increasingly popular.

In some methods, a central controller may arbitrate among multiple networks in deciding how the total available bandwidth (BW) is apportioned. This centralized decision making scheme can cause large delays and incur heavy messaging overhead as the number of neighboring networks grows.

Embodiments of the present invention may allow multiple interfering or neighboring networks to coordinate the sharing of a medium or channel between themselves. Each network may carve out for itself a portion of the BW through a sequence of message exchanges with devices in neighboring networks. If required, each network's operations may be kept completely secure and autonomous. Coordination messages between networks may be the only unencrypted message exchanges. Furthermore, these methods may be completely distributed in nature. Each network may coordinate with its immediate neighbors only. The chaining effect where a network must coordinate with networks multiple hops away may be avoided. Some embodiments require no central authority to arbitrate among networks. These embodiments demonstrably improve capacity over contention access protocols used for multiple network operation through collision reduction, interference mitigation and reuse of the communication medium by non-interfering networks.

Some embodiments of the present invention employ a network model where each network has a controlling authority called a QoS Controller (QoSC). In these embodiments, there is one instance of a QoSC in each network. The QoSC manages the activities of devices within its network and performs functions such as BW allocation to connections. These embodiments may employ a Time Division Multiple Access (TDMA) scheme where the networks share bandwidth by operating in different segments of a time frame.

In these embodiments, the QoSC of each network, at network initialization, constructs an Interfering Network List (INL). The INL identifies the interfering neighboring networks. The QoSC then communicates with each of the interfering networks in its INL, through a series of message exchanges. The QoSC may indicate to its neighbors the frame configuration that it perceives and the regions within the time frame that it will be using. This message exchange may also require the neighboring QoSC to release or give up bandwidth (a portion of the time frame) in favor of the request from the QoSC for additional BW.

In some embodiments of the present invention, a time frame, as instantiated by the QoSC and observed by all devices in the network controlled by the particular QoSC, may comprise four regions:

1. Beacon Region: Beacons are control messages that identify the frame configuration and the BW assignments within the time frame to multiple networks and to devices within a given network. Each QoSC must transmit a Beacon to devices in its network to inform them of the frame configuration to follow. In many embodiments, Beacon transmissions must be transmitted without collisions in order to provide timing and accurate frame configuration information to devices in the network. Collisions occur when devices transmit simultaneously in a group of interfering networks. Consequently, embodiments of the present invention may utilize methods by which networks within an INL coordinate with one another and transmit individual Beacons without collisions. All devices in networks in an INL know not to transmit in a Beacon Region.

2. Contention Period (CP): This is a period when multiple devices use a contention access protocol to share the medium. QoSCs may use this period to communicate with other QoSCs. A network may have one or more Contention periods. Typically, contention periods of one network cannot overlap with the Contention Free period of another network in that network's INL. In most embodiments, each network must have at least one CP which is at least long enough to carry the maximum size message defined for these embodiments. Various contention access protocols may be used during the CP of these embodiments.

3. Contention Free Period (CFP): This is a period when only devices that have explicit authorization from their QoSC are allowed to transmit. A QoSC must ensure that transmissions in the CFP are contention free. Further, QoSCs must ensure that CFPs of networks in an INL do not coincide or overlap.

4. Stay-Out period (SOP): This is a period within the time frame when all devices in a network are instructed by the QoSC to remain silent. They must not use either the contention access protocol or the contention free access protocol during the SOP.

Each QoSC constructs its version of the time frame and broadcasts this in its Beacon. All devices in a network decode the Beacon from their QoSC and must observe the time schedule indicated therein. When constructing its version of the time frame, the QoSC is obligated to follow certain rules, which determine what segments of time are available for the QoSC to claim. These rules when used along with the INL, ensure that there is re-use of capacity among networks that don't interfere with one another even though they share a common communication channel.

Once a time frame is instantiated and transmitted in the beacon, all devices in a network must observe the schedule indicated therein. All operations within a portion of the time frame that belongs to a particular network are autonomous to that network and the QoSC may manage its share of the BW any way it sees fit.

Embodiments of the present invention may comprise a distributed model for coordination among multiple neighboring networks based on Interfering Network Lists. These embodiments do not require a central authority to arbitrate between multiple networks.

Embodiments of the present invention may also comprise methods and systems for networks to share BW with other networks in an INL through coordination achieved by a series of message exchanges. In some embodiments, the message exchange is simple and requires minimal capacity for signaling overhead. Such coordination may allow each network to provide QoS support to applications/devices within its domain. In some embodiments, coordination dramatically enhances system capacity utilization and efficiency.

Embodiments of the present invention may comprise a distributed coordination mechanism that restricts all decision making to an INL and does not require networks that are multiple hops away to coordinate with one another.

Embodiments of the present invention may comprise a coordination mechanism that allows networks to re-use the portions of time frames that are already in use by non-interfering networks. This approach can boost system capacity significantly over contention protocols or other methods with limited coordination or coordination achieved through extensive signaling.

Embodiments of the present invention may dramatically increase performance in autonomous networks that operate and provide QoS support for applications such as voice over Internet Protocol (VoIP), High Definition Television (HDTV), SDTV transmission, streaming Internet Protocol (IP) applications, etc.

Embodiments of the present invention may be used in conjunction with networks compliant with IEEE 802.15.3, IEEE 802.11 or HomePlug Powerline Communications standards. These standards and their defining documents are hereby incorporated herein by reference.

Embodiments of the present invention may comprise bandwidth sharing or allocation wherein bandwidth sharing/allocation decisions are made locally among QoSCs identified in an Interfering Networks List (INL).

Embodiments of the present invention may comprise systems and methods that allow spatial reuse through the concept of using INLs.

Embodiments of the present invention may comprise Beacon and data transmissions from different networks that may occur simultaneously if certain interference conditions are satisfied.

TDMA Frame Structure

Embodiments of the present invention may be described with reference to an exemplary network scenario. This exemplary scenario is illustrated in FIG. 1. In this scenario, a Base Station Set (BSS) 10 is a network comprising a Quality of Service Controller (QoSC) 12 and the stations (STAs) it controls 14-20. A QoSC 12, in coordination with other QoSC's 22-30 in the neighborhood, may allocate a TDMA frame to one or more of the following uses:

1. For transmission of Beacons;
2. for contention-free access;
3. for contention access; or
4. for a stay-out region where transmission is not allowed.

An exemplary frame structure may be described with reference to FIG. 2. A QoSC may reserve bandwidth during a Contention Period 64. Once a QoSC/network has declared a certain time interval as its Contention-Free period 66, 70, 74, any of its Interfering Neighbors will not be allowed to transmit at the same time. As far as the Interfering Neighbors are concerned, that time interval is a Stay-Out Region 68, 72, 76 wherein no transmission may occur. Multiple BSSs may share a Contention-Free Period when their stations do not interfere. For example, in the exemplary system illustrated in FIGS. 1 & 2, during the Contention-Free Period 66 of QoSC "B" 22 (with a Network Identification (NID) of #132), QoSC "D" 26 (NID=#138a) has also scheduled a Contention-Free Period 70. This can be achieved because QoSC "B" 22 has no stations that interfere with the stations administered by QoSC "D" 26. When QoSCs do not schedule all time within a frame for Contention-Free Periods 66, 70, 74, any remaining time may be allocated as a Contention Period 78, 80 for all network stations or a particular set of stations. Bandwidth allocation decisions may be based on a first-come-first-served basis or by station, user, network or other priority methods.

For each BSS sub-network 20-30, any time that is not the Beacon Region 62, a Contention-Free Period 66, 70, 74, or a Stay-Out Region 68, 72 & 76 may become a Contention Period 64, 78, 80. Stations in that BSS network are allowed to transmit in the Contention Period using Carrier Sense Multiple Access (CSMA) or some other protocol that resolves multiple device contention.

Communications between two neighbor networks can take place during the time when the Contention Periods of the two BSS networks overlap. Inter-BSS network communication may occur when the Contention Periods of all neighbor networks overlap for some minimum duration. This minimum duration should be long enough to transmit any neighbor network message efficiently using CSMA or some other method.

Some embodiments of the present invention may employ a distributed approach. When a new QoSC is powered up, it will try to decode all the Beacons it can detect. If, after several Beacon Cycles, no Beacon is received, the new QoSC will establish a new network with no interfering neighbors.

If Beacons are received, the new QoSC will coordinate with its neighbor QoSCs to find out a Network ID (NID) and a slot in the Beacon Region 62 for the new network. Only the interfering neighbors of the new QoSC need to be involved in the process.

A similar distributed approach may be used to reserve bandwidth for a Contention-Free Period. A QoSC may negotiate with its interfering neighbor QoSCs to find an allocation for its station's reserved links.

Some embodiments of the present invention comprise one or more Interfering Networks Lists (INLs). Each QoSC may maintain an Interfering Networks List (INL). The entries of the INL may comprise the NIDs of the networks that the QoSC can receive. A neighbor network may be identified in an INL if the QoSC or, in some embodiments a STA controlled by the QoSC, can hear the Beacon for that network. In some cases, it is possible that some stations in the network controlled by the QoSC may not hear the interfering Beacon.

Some embodiments of the present invention may employ Beacon Protocol Data Units (Beacon PDUs) to negotiate network status. As mentioned above, the Beacon Region 62 may be divided into slots. The Beacon of each network is scheduled to be transmitted in one of these slots.

Inside each BEACON PDU, the following fields may be used by a new QoSC to set up its network:

1. The NID of the BSS network;
2. The slot number where the Beacon is transmitted;
3. The total number of slots in the Beacon Region;
4. Allocations of the network, which include:
   a. The locations of Contention-Free Periods (i.e. reserved links of the network).
   b. The locations of Stay-Out Regions.
   c. The locations of Contention Periods.

Figure 4:
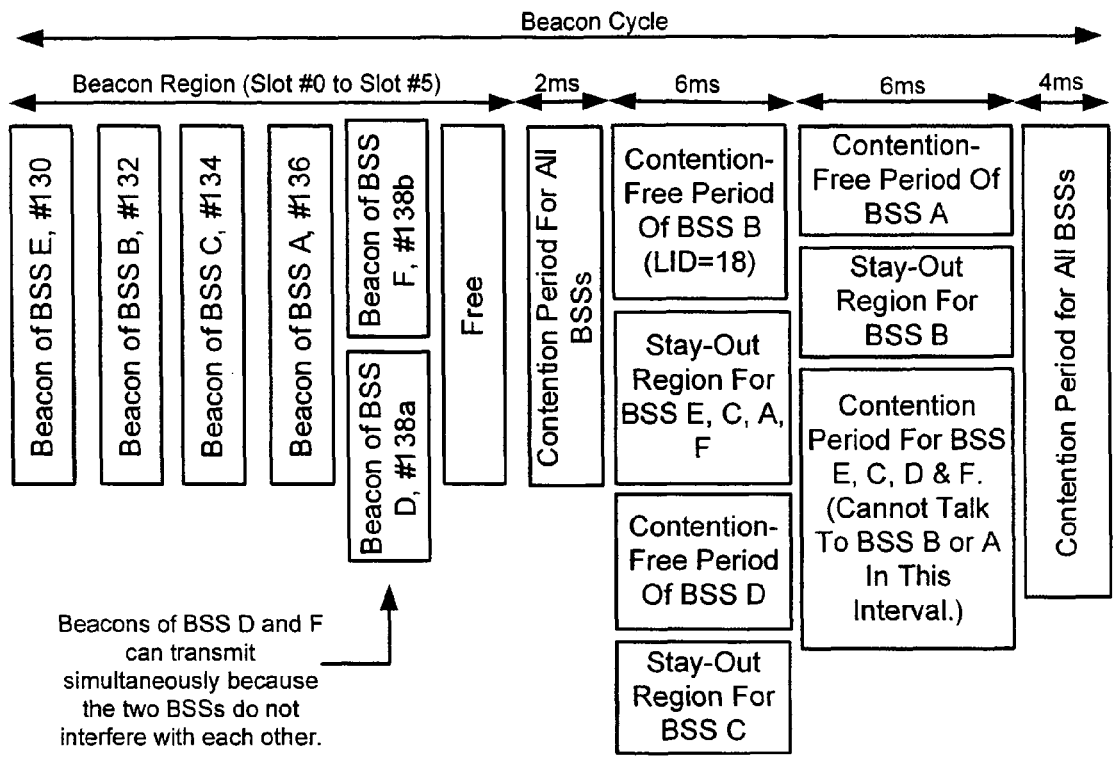
FIG. 4 is a diagram showing an exemplary TDMA frame after an new QoSC has joined.

Table 1 shows a portion of an exemplary BEACON PDU (Many other fields may be used that are not shown in the table of Table 1). FIG. 4 shows an exemplary beacon schedule.

Table 1 shows the portion of the BEACON PDU that is relevant to the discussions of Neighbor Networks. (Many other fields are not shown in the Table.)

TABLE 1

Portion of a BEACON PDU

| Field Name | | Bits | Definition |
|---|---|---|---|
| Beacon Region | NID | 8 | Network ID of this BSS network. Valid value is between 129 and 254. |
| | SlotID | 8 | Slot number where this Beacon is transmitted. Valid value is between 0 and (NumSlots-1). |
| | NumSlots | 8 | Number of slots in the Beacon Region of this BSS. Valid value is between 1 and TBD. |
| Coding | | 1 | Coding method in which schedules are specified. Set to 0 to mean relative (TDMA) coding (only "Duration" is used). Set to 1 to mean OFDMA coding (exact format TBD). |
| NumSch | | 7 | Number of schedules to follow. The schedules inform the stations of this network about the usage of the powerline channel in each time interval. |
| SchStartTime (present only if Coding = 0) | | 16 | This field is present only if Coding=0. It specifies the start time of the first schedule in micro-seconds relative to the end of the Beacon Region. E.g. SchStartTime = 1000 means the first schedule starts 1 ms after the end of the Beacon Region. The time between the end of the Beacon Region and before the start of the first schedule is reserved. |
| Schedule_1 | | 32 | First schedule. (See Table 2.) |
| . . . | | | |
| Schedule_n | | 32 | nth schedule. (See Table 2.) |

TABLE 2

Format of each "Schedule" in the BEACON PDU.
(Coding=0, "relative" or TDMA) Format of "Schedule_n" in the BEACON PDU

| Field Name | Bits | Definition |
|---|---|---|
| Fixed | 1 | 1 means the schedule is fixed and cannot be moved. 0 means otherwise. |
| (reserved) | 7 | Reserved. |

TABLE 2-continued

Format of each "Schedule" in the BEACON PDU. (Coding=0, "relative" or TDMA) Format of "Schedule_n" in the BEACON PDU

| Field Name | Bits | Definition |
|---|---|---|
| ID | 8 | ID of the schedule. ID=0 means Stay-Out region. ID= 255 means Contention Period. ID between 1 and 127 means reserved link of the network. Other values are reserved. |
| Duration | 16 | Duration of this schedule, in micro-seconds. |

Procedures for Setting up a New BSS Network

This Section describes detailed procedures of setting up a new BSS Network in some exemplary embodiments of the present invention. In the exemplary network scenario, it is assumed that some Interfering Neighbor BSS networks already exist.

Aspects of some embodiments of the present invention may be described with reference to FIG. 1. In FIG. 1, only the QoSCs 12, 22-30 and some NIDs 14-20 of each BSS are shown. An arrow 32, 34 between two QoSCs means that the two QoSCs can hear each other and at least one station in each of their respective networks interferes with a station in the other's network. In this scenario, a new QoSC "F" 30 can hear only BSS/QoSC "E" 28 and BSS/QoSC "B" 22.

Figure 2:
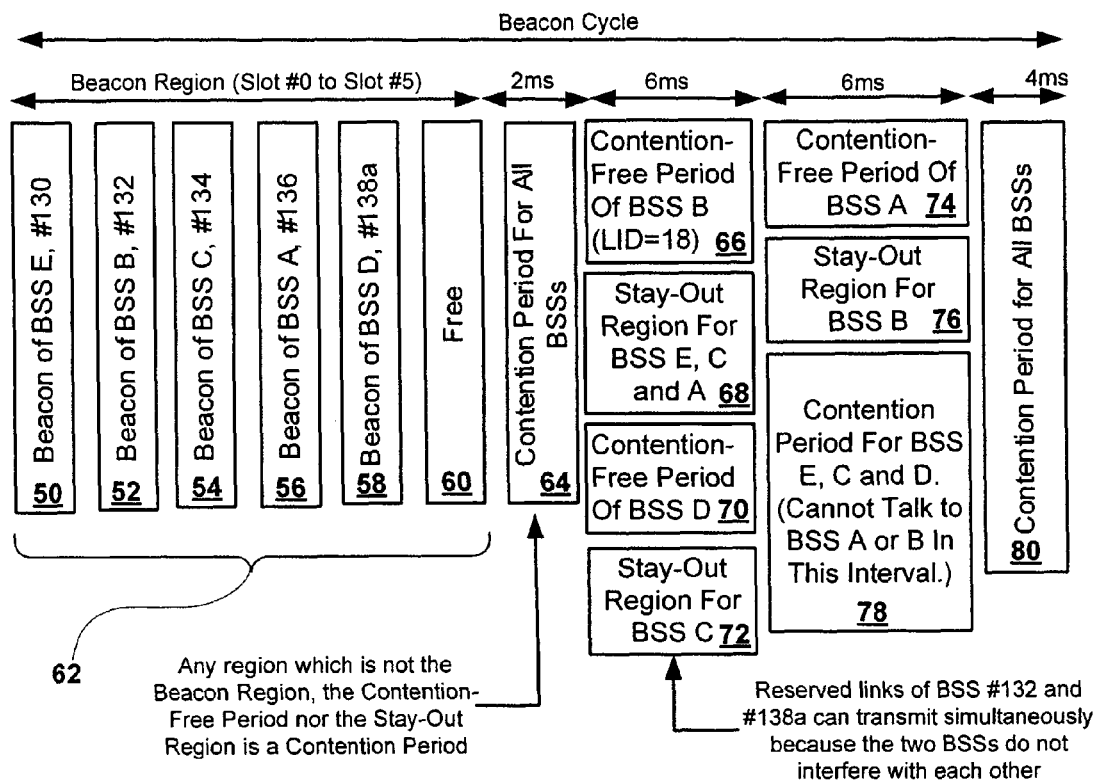
FIG. 2 shows an exemplary TDMA frame for the exemplary network shown in FIG. 1.

Table 3 shows a portion of the content of each Beacon in the exemplary system (See also FIG. 2). In this exemplary embodiment, it is assumed that there are currently 6 slots in the Beacon Region 62. For example, the Beacon of BSS "E" 28 says that its NID is #130, its Beacon is transmitted in Slot #0, and there are 6 slots in its Beacon Region.

TABLE 3

Content of each Beacon.

| | NID | SlotID | NumSlots |
|---|---|---|---|
| Beacon of BSS "E" | 130 | 0 | 6 |
| Beacon of BSS "B" | 132 | 1 | 6 |
| Beacon of BSS "C" | 134 | 2 | 6 |
| Beacon of BSS "A" | 136 | 3 | 6 |
| Beacon of BSS "D" | 138 | 4 | 6 |

In some exemplary embodiments of the present invention, the following is a list of the conditions that must be satisfied before a new BSS network can be established in an existing Neighbor Network or before a new bandwidth request is granted.

1. There is a vacant slot in the Beacon Region for the new Beacon. If a free slot is not available, then the QoSCs involved must make sure that the maximum size of the Beacon Region has not been reached.

2. Each QoSC involved must make sure that a minimum duration of Contention Period is maintained between itself and all its neighbors at all times. This minimum Contention Period is required in order to exchange messages between neighbor networks.

If by accepting a new BSS network set up request or bandwidth request, one or more of the above conditions would be violated, then the request must be rejected by the other members of the existing Neighbor Network.

Figure 3:
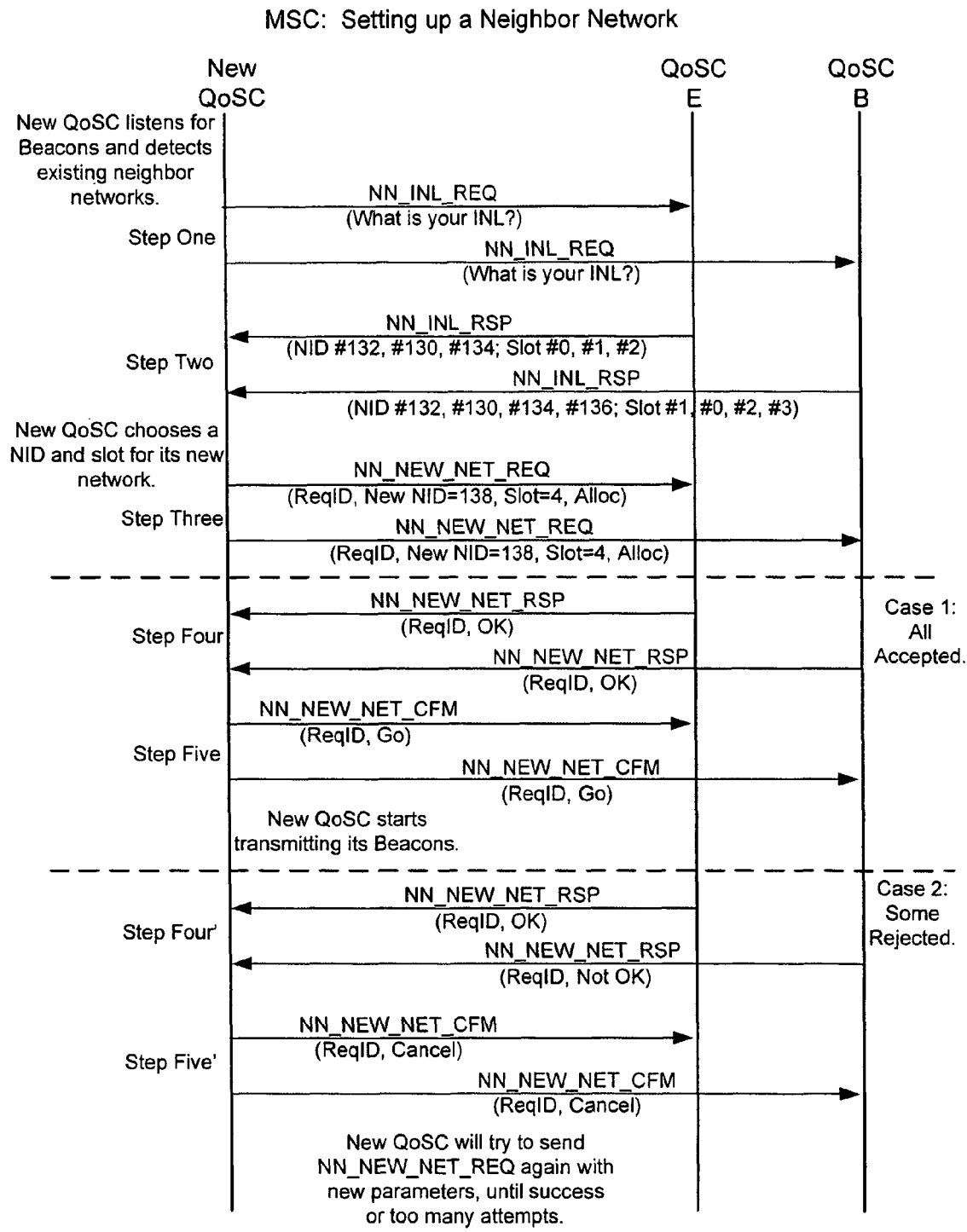
FIG. 3 is a diagram showing exemplary neighbor network set up steps.

FIG. 3 shows an exemplary message sequence chart depicting the procedures of setting up a new BSS Network with Interfering Neighbor BSS Networks (Neighbor Networks) for this exemplary embodiment. Each step in FIG. 3 is described in the following subsections.

Step One: NN_INL_REQ

The objective of Step One and Step Two is to find an NID and a slot in the Beacon Region 62 for the new network. The new QoSC 30 first will listen for Beacons to find out if neighbor networks exist. It will then send the NN_INL_REQ message to each of its neighbor QoSCs (E and B) 28 & 22. The purpose of the message is to obtain the INLs of BSS E and B 28 & 22. (This message may also carry the INL of the sender.) An exemplary embodiment of an NN_INL_REQ message is shown in Table 4.

TABLE 4

MIBODY of NNET MPDU: NN_INL_REQ

| Field Name | | Octet | BitNum | Bits | Values | Definition |
|---|---|---|---|---|---|---|
| Type | | 0 | 0-7 | 8 | 0 | Set to 0 to indicate NN_INL_REQ. |
| SrcNID | | 1 | 0-7 | 8 | 0 | NID of the sender. If the sender does not have a NID, set it to 0. |
| SlotID | | 2 | 0-7 | 8 | 0xFF | Slot number where the sender transmits its Beacon. (Set to 0xFF to indicate not valid.) |
| NumSlots | | 3 | 0-7 | 8 | 0xFF | Number of slots in the Beacon Region of the sender. (Set to 0xFF to indicate not valid.) |
| Interfering Networks List | NumEntries | 4 | 0-7 | 8 | 2 | Number of NIDs in the sender's INL. |
| | NID_1 | 5 | 0-7 | 8 | 130 | First NID in the sender's INL. It is an NID that the sender can recognize. |
| | SlotID_1 | 6 | 0-7 | 8 | 0 | Slot number where NID_1 transmits its Beacon. |
| | NumSlots_1 | 7 | 0-7 | 8 | 6 | Number of slots in the Beacon Region of NID_1. |
| | NID_2 | 8 | 0-7 | 8 | 132 | Second NID in the sender's INL. It is an NID that the sender can recognize. |
| | SlotID_2 | 9 | 0-7 | 8 | 1 | Slot number where NID_2 transmits its Beacon. |
| | NumSlots_2 | 10 | 0-7 | 8 | 6 | Number of slots in the Beacon Region of NID_2. |

When QoSC "E" 28 receives the NN_INL-REQ message, it will reply to the new QoSC 30 with an NN_INL_RSP message. An exemplary embodiment of this message is shown in Table 5. This message may contain the INL of BSS "E". It indicates that BSS "E" can hear BSS "B" and "C". In addition, it indicates that BSS "E", "B", and "C" transmit their Beacons in Slots #0, #1, and #2, respectively, and that each Beacon Region has 6 slots.

Suppose the new QoSC 30 chooses NID=138, and Slot #4. Note that NID=138 is also used by an existing BSS. This example illustrates that a single NID can be used by multiple non-interfering STAs simultaneously in some embodiments of the present invention.

Step Three: NN_NEW_NET_REQ

From the previous steps, the new QoSC 30 has decided to use Slot #4 and NID=138. Next, the new QoSC 30 will send

TABLE 5

MIBODY of NNET MPDU: NN_INL_RSP

| Field Name | | Octet | BitNum | Bits | Values | Definition |
|---|---|---|---|---|---|---|
| Type | | 0 | 0-7 | 8 | 1 | Set to 1 to indicate NN_INL_RSP. |
| SrcNID | | 1 | 0-7 | 8 | 130 | NID of the sender. If the sender does not have a NID, set it to 0. |
| SlotID | | 2 | 0-7 | 8 | 0 | Slot number where the sender transmits its Beacon. (Set to 0xFF to indicate not valid.) |
| NumSlots | | 3 | 0-7 | 8 | 6 | Number of slots in the Beacon Region of the sender. (Set to 0xFF to indicate not valid.) |
| Interfering Networks List | NumEntries | 4 | 0-7 | 8 | 2 | Number of NIDs in the sender's INL. |
| | NID_1 | 5 | 0-7 | 8 | 132 | First NID in the sender's INL. It is an NID that the sender can recognize. |
| | SlotID_1 | 6 | 0-7 | 8 | 1 | Slot number where NID_1 transmits its Beacon. |
| | NumSlots_1 | 7 | 0-7 | 8 | 6 | Number of slots in the Beacon Region of NID_1. |
| | NID_2 | 8 | 0-7 | 8 | 134 | Second NID in the sender's INL. It is an NID that the sender can recognize. |
| | SlotID_2 | 9 | 0-7 | 8 | 2 | Slot number where NID_2 transmits its Beacon. |
| | NumSlots_2 | 10 | 0-7 | 8 | 6 | Number of slots in the Beacon Region of NID_2. |

Similarly, QoSC "B" 22 will send the NN_INL_RSP message to the new QoSC 30 indicating that BSS "B" 22 can hear BSS "E", "C" and "A", and that BSS "B", "E", "C", and "A" transmit their Beacons in Slot #1, #0, #2, and #3, respectively, and that each Beacon Region has 6 slots.

When the new QoSC 30 receives all the NN_INL_RSP messages, it may then

Randomly choose a new NID which does not appear in any of the INLs of BSS "E" 28 and "B" 22.

Choose a slot which is not used by any network in the INLs of BSS "E" 28 and "B" 22.

the NN_NEW_NET_REQ message to each of its neighbor QoSC to request to set up a new network. An exemplary NN_NEW_NET_REQ message is shown in Table 6. This message may also specify the proposed schedules of the new network. Suppose the schedules are:

After the Beacon Region, Contention Period (Usage=2) of 2 ms.

Then, Stay-Out Region (Usage=0) of 6 ms.
Then, Contention Period (Usage=2) of 10 ms.

TABLE 6

MIBODY of NNET MPDU: NN_NEW_NET_REQ

| Field Name | Octet | BitNum | Bits | Values | Definition |
|---|---|---|---|---|---|
| Type | 0 | 0-7 | 8 | 2 | Set to 2 to indicate NN_NEW_NET_REQ. |
| ReqID | 1 | 0-7 | 8 | 33 | Request ID. Set by sender so that the same value was not used "recently." |
| SrcNID | 2 | 0-7 | 8 | 138 | NID of the sender. It is also the proposed NID of the new network. |
| SlotID | 3 | 0-7 | 8 | 4 | Proposed slot number to transmit the Beacons of the new network. |
| NumSlots | 4 | 0-7 | 8 | 6 | Proposed number of slots in the Beacon Region of the new network. |
| Coding | 5 | 0 | 1 | 0 | Coding method in which schedules are specified. 0 means relative (TDMA) coding (only "Duration" is used). 1 means absolute coding ("StartTime" and "Duration" are used). |
| NumSch | | 1-7 | 7 | 3 | Number of schedules to follow. The new QoSC's proposed schedule of its Beacon. |
| SchStartTime (present only if | 6-7 | 0-7 | 16 | 0 | This field is present only if Coding=0. It specifies the start time of the first schedule in micro-seconds, relative to the |

TABLE 6-continued

MIBODY of NNET MPDU: NN_NEW_NET_REQ

| Field Name | Octet | BitNum | Bits | Values | Definition |
|---|---|---|---|---|---|
| Coding=0) | | | | | end of the Beacon Region. |
| Usage_1 | 8 | 0-1 | 2 | 2 | Usage of the first schedule. 0 means Stay-Out Region. 1 means Contention-Free Period of this network. 2 means Contention Period. 3 is reserved. |
| (reserved) | | 2-7 | 6 | 0 | Reserved. |
| Duration_1 | 9-10 | 0-7 | 16 | 2000 | Duration of the first schedule, in micro-seconds. |
| Usage_2 | 11 | 0-1 | 2 | 0 | Usage of the second schedule. |
| (reserved) | | 2-7 | 6 | 0 | Reserved. |
| Duration_2 | 12-13 | 0-7 | 16 | 6000 | Duration of the second schedule, in micro-seconds. |
| Usage_3 | 14 | 0-1 | 2 | 2 | Usage of the third schedule. |
| (reserved) | | 2-7 | 6 | 0 | Reserved. |
| Duration_3 | 15-16 | 0-7 | 16 | 10000 | Duration of the third schedule, in micro-seconds. |

When QoSC "E" 28 receives the NN_NEW_NET-REQ message, it will check to see if the proposed NID, slot number, and schedule are acceptable or not. It will then reply with the NN_NEW_NET_RSP message. The message contains the results (accept or reject). An exemplary NN_NEW_NET_RSP message is shown in Table 7.

In this example, the proposed NID=138 is acceptable because NID=138 does not appear in the INL of QoSC "E" 28. The proposed Slot #4 is also acceptable because none of the neighbors of QoSC "E" 28 uses that slot. The proposed schedule is acceptable because it does not conflict with any of QoSC E's own reserved links.

Similarly, QoSC "B" 22 will also reply with the NN_NEW_NET_RSP message.

Step Five: NN_NEW_NET_CFM

When the new QoSC 30 receives all the NN_NEW_NET_RSP messages, it will check to see if its request to set up a new network is accepted or not. It will then send the NN_NEW_NET_CFM message to each of its neighbor QoSCs (E and B) 28 & 22. If the request is accepted, the new QoSC 30 can start transmitting its Beacon in the proposed slot. An exemplary NN_NEW_NET_CFM message is shown in Table 8.

TABLE 7

MIBODY of NNET MPDU: NN_NEW_NET_RSP

| Field Name | Octet | BitNum | Bits | Values | Definition |
|---|---|---|---|---|---|
| Type | 0 | 0-7 | 8 | 3 | Set to 3 to indicate NN_NEW_NET_RSP. |
| ReqID | 1 | 0-7 | 8 | 33 | Request ID. Copy directly from NN_NEW_NET_REQ. |
| SrcNID | 2 | 0-7 | 8 | 130 | NID of the sender. |
| Result | 3 | 0-7 | 8 | 0 | Set to 0 to mean NN_NEW_NET_REQ is accepted. Set to 1 to mean NN_NEW_NET_REQ is rejected because the proposed NID is not acceptable. Set to 2 to mean NN_NEW_NET_REQ is rejected because the proposed slot number or number of slots is not acceptable. Set to 3 to mean NN_NEW_NET_REQ is rejected because the proposed schedule is not acceptable. |

TABLE 8

MIBODY of NNET MPDU: NN_NEW_NET_CFM

| Field Name | Octet | BitNum | Bits | Values | Definition |
|---|---|---|---|---|---|
| Type | 0 | 0-7 | 8 | 4 | Set to 4 to indicate NN_NEW_NET_CFM. |
| ReqID | 1 | 0-7 | 8 | 33 | Request ID. Copy directly from NN_NEW_NET_REQ. |
| SrcNID | 2 | 0-7 | 8 | 138 | NID of the sender. It is also the proposed NID of the new network. |
| Result | 3 | 0-7 | 8 | 0 | Set to 0 to mean the request to set up a new network with the parameters specified is accepted. |

TABLE 8-continued

MIBODY of NNET MPDU: NN_NEW_NET_CFM

| Field Name | Octet | BitNum | Bits | Values | Definition |
|---|---|---|---|---|---|
| | | | | | Set to 1 to mean the request to set up a new network with the parameters specified is canceled. |

TABLE 9

| | NID | SlotID | NumSlots |
|---|---|---|---|
| Beacon of BSS E, #130 | 130 | 0 | 6 |
| Beacon of BSS B, #132 | 132 | 1 | 6 |
| Beacon of BSS C, #134 | 134 | 2 | 6 |
| Beacon of BSS A, #136 | 136 | 3 | 6 |
| Beacon of BSS D, #138a | 138 | 4 | 6 |
| Beacon of BSS F, #138b | 138 | 4 | 6 |

Table 9 shows a portion of the content of each Beacon in the system after the new QoSC has joined the system as BSS #138b.

An exemplary revised TDMA frame showing network status after the new QoSC has joined the system is shown in FIG. 4.

Procedures for Requesting Bandwidth

Figure 5:
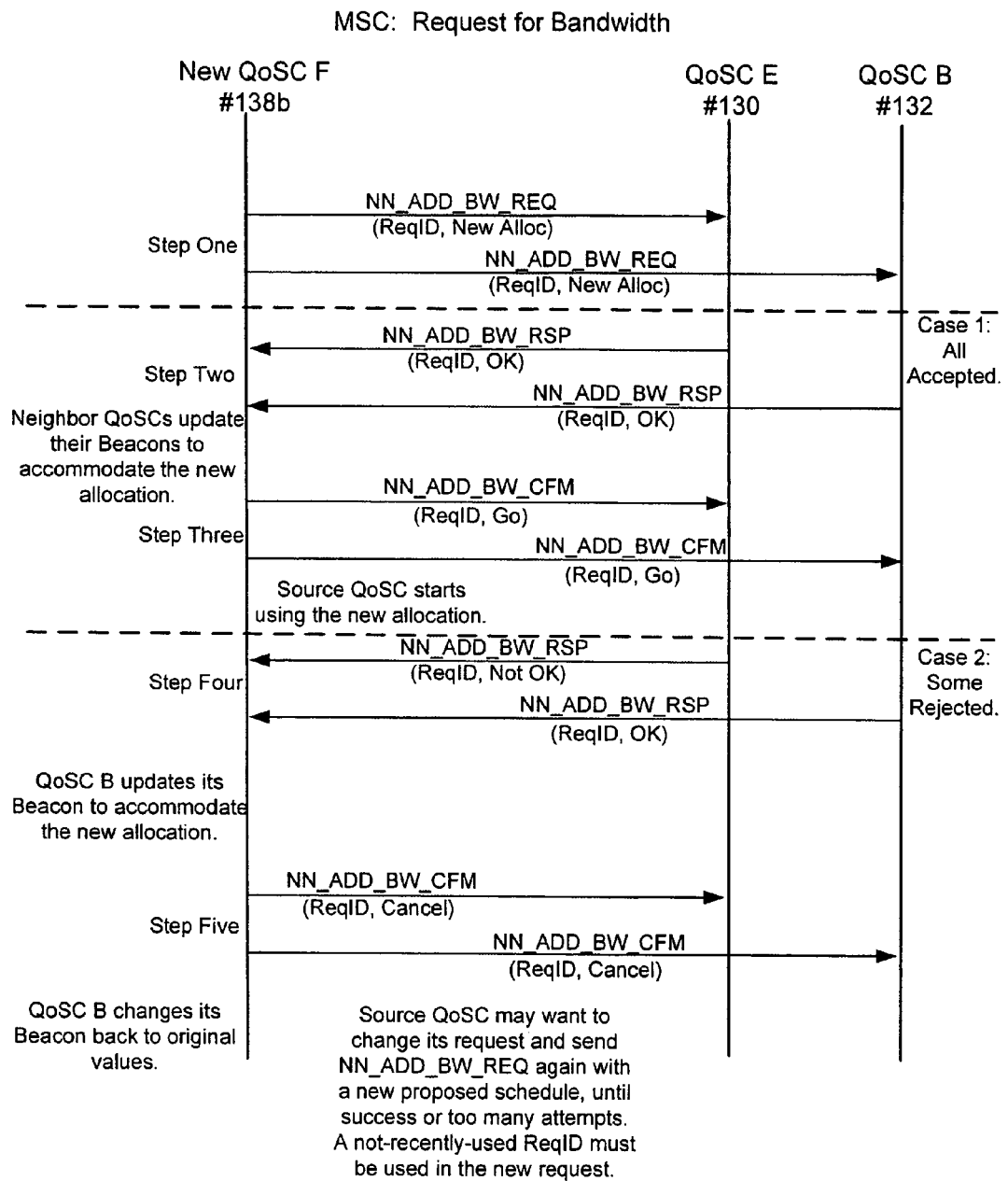
FIG. 5 is a message sequence chart showing exemplary procedures for requesting bandwidth.

This Section describes the detailed procedures of requesting bandwidth for a network in some embodiments of the present invention. Consider the network scenario illustrated in FIG. 1 after the new QoSC "F" 30 has joined the system as a BSS with NID #138(b). The corresponding TDMA frame is shown in FIG. 4. Suppose that QoSC "F" 30 wants to request for a Contention-Free Period of duration 3 ms for its reserved links. FIG. 5 shows an exemplary message sequence chart of the procedures. Each step illustrated in FIG. 5 is described in the following subsections. (Note: The new QoSC 30 could also request for a Contention-Free Period when it sends the NN_NEW_NET_REQ by setting the "Usage" field to 1 in its proposed schedule.)

Step One: NN_ADD_BW-REQ

In these embodiments, illustrated in FIG. 5, the source QoSC "F" 30 may first determine a proposed schedule. It decodes the Beacons of all its neighbor QoSCs 22, 28 to find out the current schedules of its neighbors. Suppose QoSC "F" 30 proposes to use an interval (of duration 3 ms) which overlaps with the Contention-Free Period 74 of BSS "A" 12. The proposed interval can be specified by a start time of 8 ms (relative to the end of the Beacon Region), and a duration of 3 ms. QoSC "F" 30 may send the NN_ADD_BW_REQ message to all its neighbors. The message includes the additional proposed time intervals that the source QoSC wants to reserve. An exemplary NN_ADD_BW_REQ message is shown in Table 10.

TABLE 10

MIBODY of NNET MPDU: NN_ADD_BW_REQ (Coding 1)

| Field Name | Octet | BitNum | Bits | Values | Definition |
|---|---|---|---|---|---|
| Type | 0 | 0-7 | 8 | 5 | Set to 5 to indicate NN_ADD_BW_REQ. |
| ReqID | 1 | 0-7 | 8 | 88 | Request ID. Set by sender so that the same value was not used "recently." |
| SrcNID | 2 | 0-7 | 8 | 138 | NID of the sender. |
| Coding (1) | 3 | 0 | 1 | 1 | Coding method in which schedules are specified. Must be set to 1. |
| NumSch | | 1-7 | 7 | 1 | Number of schedules to follow. The sender wants to reserve each time interval for its Contention-Free Period. |
| Duration_1 | 4-5 | 0-7 | 16 | 3000 | Duration of the first schedule, in micro-seconds. |
| StartTime_1 | 6-7 | 0-7 | 16 | 8000 | Start time of the first schedule, in micro-seconds, relative to the end of the Beacon Region. |

When QoSC "E" 28 receives the NN_ADD_BW_REQ, it will check to see if the proposed schedule is acceptable or not. In this case, the proposed schedule does not conflict with the current schedule of QoSC "E" 28, so the request is accepted. QoSC "E" 28 may reply with the NN_ADD_BW_RSP message and update the schedule in its Beacon to include a new Stay-Out region. An exemplary NN_ADD_BW_RSP message is shown in Table 11. Similarly, QoSC "B" 22 may reply with the NN_ADD_BW_RSP message.

TABLE 11

MIBODY of NNET MPDU: NN_ADD_BW_RSP

| Field Name | Octet | BitNum | Bits | Values | Definition |
|---|---|---|---|---|---|
| Type | 0 | 0-7 | 8 | 6 | Set to 6 to indicate NN_ADD_BW_RSP. |
| ReqID | 1 | 0-7 | 8 | 88 | Request ID. Copy directly from NN_ADD_BW_REQ. |
| SrcNID | 2 | 0-7 | 8 | 130 | NID of the sender. |
| Result | 3 | 0-7 | 8 | 0 | Set to 0 to mean NN_ADD_BW_REQ is accepted. Set to 1 to mean NN_ADD_BW_REQ is rejected because the proposed schedule is being reserved by another QoSC. Set to 2 to mean NN_ADD_BW_REQ is rejected because the resultant Contention Period remaining would become too short. |

When the source QoSC "F" 30 receives all the NN_ADD_BW_RSP messages, it will check to see if its request is accepted or not. It will then send the NN_ADD_BW_CFM message to each of its neighbor QoSC. If the request is accepted, it will also update the schedule in its Beacon to reflect the new reserved link. An exemplary NN_ADD_BW_CFM message is shown in Table 12.

TABLE 12

MIBODY of NNET MPDU: NN_ADD_BW_CFM

| Field Name | Octet | BitNum | Bits | Values | Definition |
|---|---|---|---|---|---|
| Type | 0 | 0-7 | 8 | 7 | Set to 7 to indicate NN_ADD_BW_CFM. |
| ReqID | 1 | 0-7 | 8 | 88 | Request ID. Copy directly from NN_ADD_BW_REQ. |
| SrcNID | 1 | 0-7 | 8 | 138 | NID of the sender. |
| Action | 3 | 0-7 | 8 | 0 | Set to 0 to mean the bandwidth request is successful. Set to 1 to mean the bandwidth request is canceled. |

Figure 6:
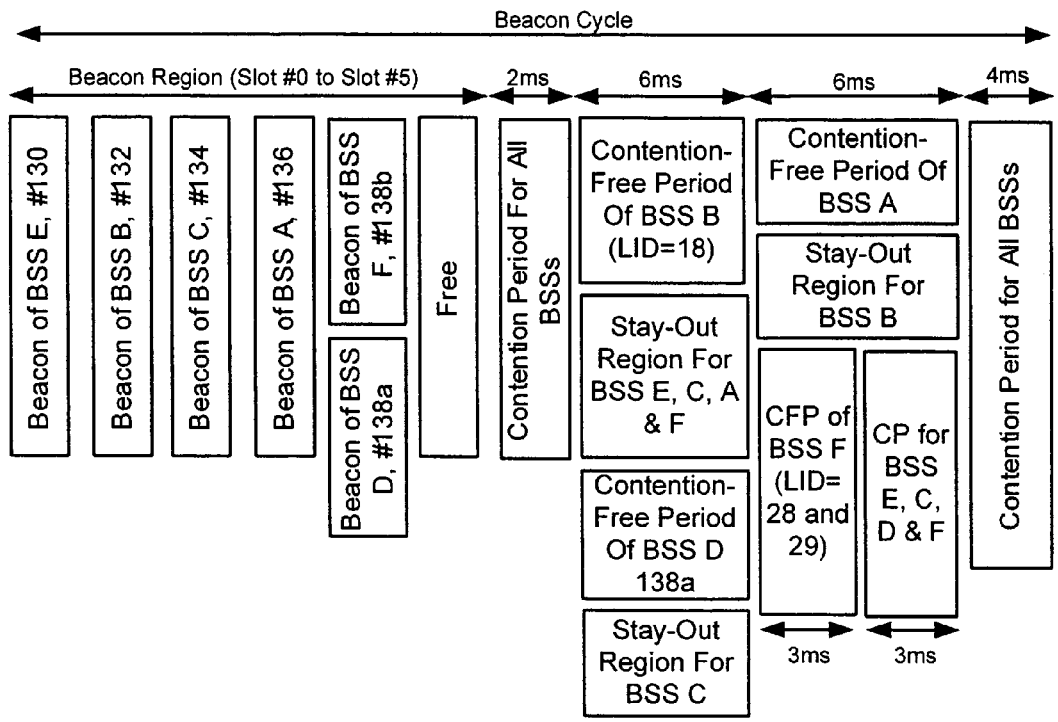
FIG. 6 is a diagram showing an exemplary TDMA frame after a QoSC has been granted bandwidth.

FIG. 6 shows the new TDMA frame after the bandwidth request is accepted. Note that QoSC "F" 30 may assign any number of reserved links to its new Contention-Free Period.

Procedures for Releasing Bandwidth

Figure 7:
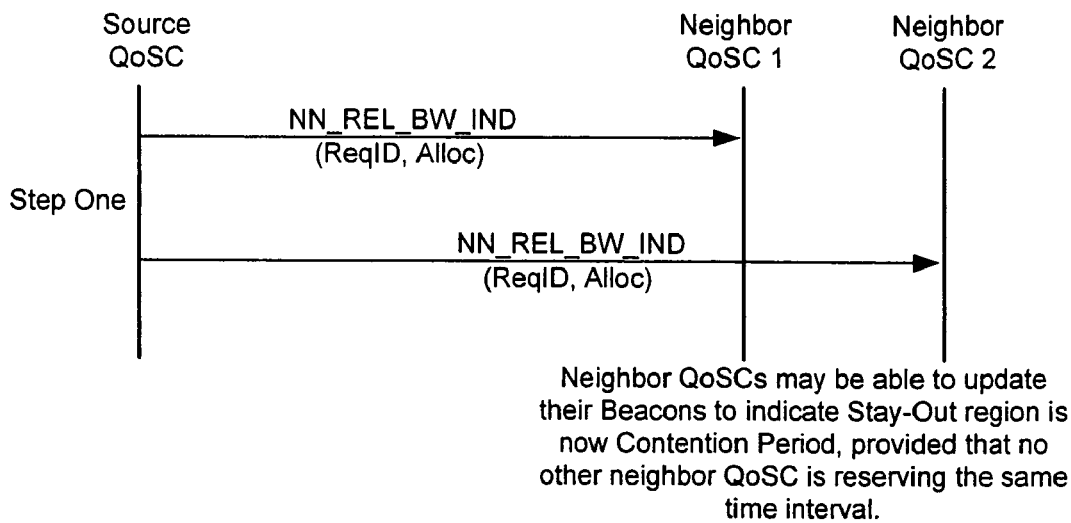
FIG. 7 is a message sequence chart showing exemplary procedures for releasing a Contention-Free Period.

An exemplary message sequence chart for releasing bandwidth used by the Contention-Free Period is shown in FIG. 7. The source QoSC sends the NN_REL_BW_IND message to all its neighbors. Note that a response message is not required. Upon receiving the bandwidth release request, a QoSC may be able to change the Stay-Out region into a Contention Period provided that no other neighbor QoSC is reserving the same time interval.

Procedures for Shutting Down a Network

Figure 8:
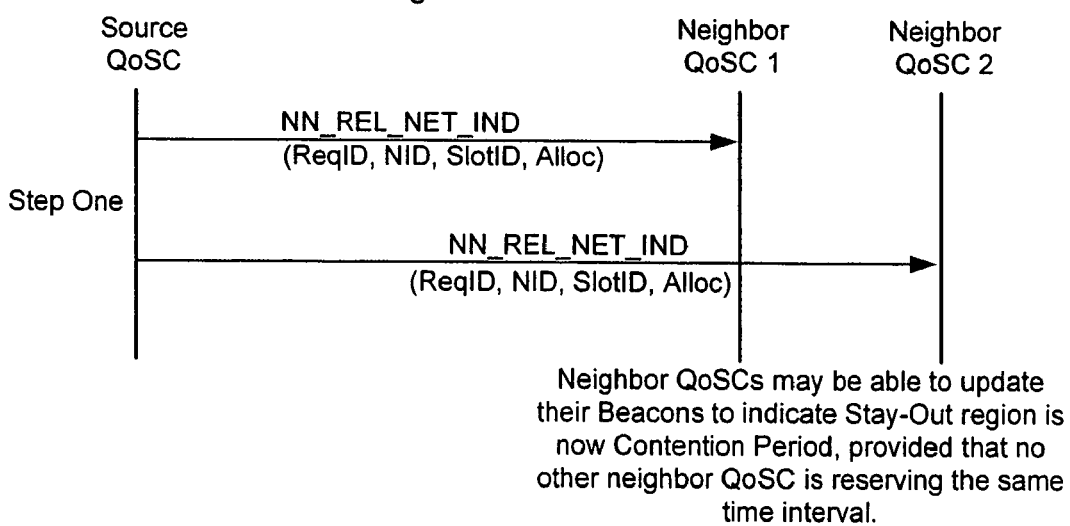
FIG. 8 is a message sequence chart showing exemplary procedures for shutting down a network.

An exemplary message sequence chart for shutting down a network is shown in FIG. 8. The QoSC sends the NN_REL_NET_IND message to all its neighbors. A response message is not required.

Message Format

In some embodiments of the present invention a new MPDU type called NNET PDU may be employed. An NNET PDU can carry different messages depending on the value of a "Type" field.

NN_INL_REQ and NN_INL_RSP

The NN_INL_REQ message is used by a QoSC to find out the INL of another QoSC. When a QoSC receives the NN_INL_REQ message, it must reply with the NN_INL_RSP message. An exemplary NN_INL_REQ message is shown in Table 13.

TABLE 13

MIBODY of NNET MPDU: NN_INL_REQ and NN_INL_RSP

| Field Name | Octet | BitNum | Bits | Definition |
|---|---|---|---|---|
| Type | 0 | 0-7 | 8 | Set to 0 to indicate NN_INL_REQ. Set to 1 to indicate NN_INL_RSP. |
| SrcNID | 1 | 0-7 | 8 | NID of the sender. If the sender does not have a NID, set it to 0. |
| SlotID | 2 | 0-7 | 8 | Slot number where the sender transmits its Beacon. (Set to 0xFF to indicate not valid.) |
| NumSlots | 3 | 0-7 | 8 | Number of slots in the Beacon Region of the sender. (Set to 0xFF to indicate not valid.) |

TABLE 13-continued

MIBODY of NNET MPDU: NN_INL_REQ and NN_INL_RSP

| Field Name | | Octet | BitNum | Bits | Definition |
|---|---|---|---|---|---|
| Interfering Networks List | NumEntries | 4 | 0-7 | 8 | Number of NIDs in the sender's INL. |
| | NID_1 | Variable | 0-7 | 8 | First NID in the sender's INL. It is an NID that the sender can recognize. |
| | SlotID_1 | Variable | 0-7 | 8 | Slot number where NID_1 transmits its Beacon. |
| | NumSlots_1 | Variable | 0-7 | 8 | Number of slots in the Beacon Region of NID_1. |
| | . | | | | |
| | . | | | | |
| | . | | | | |
| | NID_n | Variable | 0-7 | 8 | $n^{th}$ NID in the sender's INL. It is an NID that the sender can recognize. |
| | SlotID_n | Variable | 0-7 | 8 | Slot number where NID_n transmits its Beacon. |
| | NumSlots_n | Variable | 0-7 | 8 | Number of slots in the Beacon Region of NID_n. |

The NN_NEW_NET_REQ message is used by a new QoSC to request to set up a new network. This message contains the proposed NID, slot number, and schedule. A copy of this message must be sent to each of the neighbors of the new QoSC. An exemplary embodiment of the NN_NEW_NET_REQ message when the "Coding" field is 0 is shown in Table 14.

TABLE 14

MIBODY of NNET MPDU: NN_NEW_NET_REQ (Coding=0)

| Field Name | Octet | BitNum | Bits | Definition |
|---|---|---|---|---|
| Type | 0 | 0-7 | 8 | Set to 2 to indicate NN_NEW_NET_REQ. |
| ReqID | 1 | 0-7 | 8 | Request ID. Set by sender so that the same value was not used "recently." |
| SrcNID | 2 | 0-7 | 8 | NID of the sender. It is also the proposed NID of the new network. |
| SlotID | 3 | 0-7 | 8 | Proposed slot number to transmit the Beacons of the new network. |
| NumSlots | 4 | 0-7 | 8 | Proposed number of slots in the Beacon Region of the new network. |
| Coding (=0) | 5 | 0 | 1 | Coding method in which schedules are specified. 0 means relative (TDMA) coding (only "Duration" is used). 1 means absolute coding ("StartTime" and "Duration" are used). |
| NumSch | | 1-7 | 7 | Number of schedules to follow. |
| SchStartTime (present only if Coding=0) | 6-7 | 0-7 | 16 | This field is present only if Coding=0. It specifies the start time of the first schedule in micro-seconds, relative to the end of the Beacon Region. |
| Usage_1 | 8 | 0-1 | 2 | Usage of the first schedule. 0 means Stay-Out Region. 1 means Contention-Free Period of this network. 2 means Contention Period. 3 is reserved. |
| (reserved) | | 2-7 | 6 | Reserved. |
| Duration_1 | 9-10 | 0-7 | 16 | Duration of the first schedule, in micro-seconds. |
| . | | | | |
| . | | | | |
| . | | | | |
| Usage_n | Variable | 0-1 | 2 | Usage of the $n^{th}$ schedule. 0 means Stay-Out Region. 1 means Contention-Free Period of this network. 2 means Contention Period. 3 is reserved. |
| (reserved) | | 2-7 | 6 | Reserved. |
| Duration_n | Variable | 0-7 | 16 | Duration of the $n^{th}$ schedule, in micro-seconds. |

The format of an exemplary NN_NEW_NET_REQ message when the "Coding" field is 1 is shown in Table 15. The usage of any time interval that is not specified may be assumed to be a Stay-Out region (i.e. Usage=0).

TABLE 15

MIBODY of NNET MPDU: NN_NEW_NET_REQ (Coding=1)

| Field Name | Octet | BitNum | Bits | Definition |
|---|---|---|---|---|
| Type | 0 | 0-7 | 8 | Set to 2 to indicate NN_NEW_NET_REQ. |
| ReqID | 1 | 0-7 | 8 | Request ID. Set by sender so that the same value was not used "recently." |
| SrcNID | 2 | 0-7 | 8 | NID of the sender. It is also the proposed NID of the new network. |
| SlotID | 3 | 0-7 | 8 | Proposed slot number to transmit the Beacons of the new network. |
| NumSlots | 4 | 0-7 | 8 | Proposed number of slots in the Beacon Region of the new network. |
| Coding (=1) | 5 | 0 | 1 | Coding method in which schedules are specified. 0 means relative (TDMA) coding (only "Duration" is used). 1 means absolute coding ("StartTime" and "Duration" are used). |
| NumSch |  | 1-7 | 7 | Number of schedules to follow. |
| Usage_1 | 6 | 0-1 | 2 | Usage of the first schedule. 0 means Stay-Out Region. 1 means Contention-Free Period of this network. 2 means Contention Period. 3 is reserved. |
| (reserved) |  | 2-7 | 6 | Reserved. |
| Duration_1 | 7-8 | 0-7 | 16 | Duration of the first schedule, in micro-seconds. |
| StartTime_1 | 9-10 | 0-7 | 16 | Start time of the first schedule, in micro-seconds, relative to the end of the Beacon Region. |
| . |  |  |  |  |
| . |  |  |  |  |
| . |  |  |  |  |
| Usage_n | Variable | 0-1 | 2 | Usage of the $n^{th}$ schedule. 0 means Stay-Out Region. 1 means Contention-Free Period of this network. 2 means Contention Period. 3 is reserved. |
| (reserved) |  | 2-7 | 6 | Reserved. |
| Duration_n | Variable | 0-7 | 16 | Duration of the $n^{th}$ schedule, in micro-seconds. |
| StartTime_n | Variable | 0-7 | 16 | Start time of the $n^{th}$ schedule, in micro-seconds, relative to the end of the Beacon Region. |

When a QoSC receives a NN_NEW_NET_REQ message, it may reply with the NN_NEW_NET_RSP message. An exemplary NN_NEW_NET_RSP message is shown in Table 16. The NN_NEW_NET_RSP message may contain the NID of the sender, and a result field indicating if the request is accepted or not. When determining if the request is acceptable, the QoSC may check the following:
- Make sure the proposed NID does not appear in the QoSC's INL.
- None of the neighbors of the QoSC are transmitting in the proposed slot in the Beacon Region.
- The proposed schedule is acceptable. For example, none of the QoSC's own reserved links will be affected by the proposed schedule, and a minimum duration of shared Contention Period among all neighbor networks is maintained.

The NN_NEW_NET_CFM message may be sent by the new QoSC to all its neighbor QoSCs to confirm if the request to set up a new network is successful or canceled. This message may be sent after the new QoSC has received all the NN_NEW_NET_RSP messages from its neighbors. An exemplary NN_NEW_NET_CFM message is shown in Table 17.

For example, one of the neighbor QoSCs may have rejected the request, while all the other neighbor QoSCs may have accepted the request. In this case, the new QoSC may send the NN_NEW_NET_CFM message to all its neighbor QoSCs to cancel the request.

TABLE 16

MIBODY of NNET MPDU: NN_NEW_NET_RSP

| Field Name | Octet | BitNum | Bits | Definition |
|---|---|---|---|---|
| Type | 0 | 0-7 | 8 | Set to 3 to indicate NN_NEW_NET_RSP. |
| ReqID | 1 | 0-7 | 8 | Request ID. Copy directly from NN_NEW_NET_REQ. |
| SrcNID | 2 | 0-7 | 8 | NID of the sender. |
| Result | 3 | 0-7 | 8 | Set to 0 to mean NN_NEW_NET REQ is accepted. Set to 1 to mean NN_NEW_NET_REQ is rejected because the proposed NID is not acceptable. Set to 2 to mean NN_NEW_NET_REQ is rejected because the proposed slot number or number of slots is not acceptable. Set to 3 to mean NN_NEW_NET_REQ is rejected because the proposed schedule is not acceptable. |

TABLE 17

MIBODY of NNET MPDU: NN_NEW_NET_CFM

| Field Name | Octet | BitNum | Bits | Definition |
|---|---|---|---|---|
| Type | 0 | 0-7 | 8 | Set to 4 to indicate NN_NEW_NET_CFM. |
| ReqID | 1 | 0-7 | 8 | Request ID. Copy directly from NN_NEW_NET_REQ. |
| SrcNID | 2 | 0-7 | 8 | NID of the sender. It is also the proposed NID of the new network. |
| Action | 3 | 0-7 | 8 | Set to 0 to mean the request to set up a new network is successful. Set to 1 to mean the request to set up a new network is canceled. |

The NN_ADD_BW-REQ message is sent by a source QoSC to all its neighbor QoSCs to request additional bandwidth. The message contains the proposed time intervals used by the source QoSC. Each interval may be specified by a start time and a duration. The start time may be measured from the end of the Beacon Region. The usage of any time interval that is not specified in the message may be left unchanged. An exemplary NN_ADD_BW_REQ message is shown in Table 18.

TABLE 18

MIBODY of NNET MPDU: NN_ADD_BW_REQ (Coding 1)

| Field Name | Octet | BitNum | Bits | Definition |
|---|---|---|---|---|
| Type | 0 | 0-7 | 8 | Set to 5 to indicate NN_ADD_BW_REQ. |
| ReqID | 1 | 0-7 | 8 | Request ID. Set by sender so that the same value was not used "recently." |
| SrcNID | 2 | 0-7 | 8 | NID of the sender. |
| Coding (1) | 3 | 0 | 1 | Coding method in which schedules are specified. Must be set to 1. |
| NumSch |  | 1-7 | 7 | Number of schedules to follow. The sender wants to reserve each time interval for its Contention-Free Period. |
| Duration_1 | 4-5 | 0-7 | 16 | Duration of the first schedule, in micro-seconds. |
| StartTime_1 | 6-7 | 0-7 | 16 | Start time of the first schedule, in micro-seconds, relative to the end of the Beacon Region. |
| . |  |  |  |  |
| . |  |  |  |  |
| . |  |  |  |  |
| Duration_n | Variable | 0-7 | 16 | Duration of the $n^{th}$ schedule, in micro-seconds. |
| StartTime_n | Variable | 0-7 | 16 | Start time of the $n^{th}$ schedule, in micro-seconds, relative to the end of the Beacon Region. |

When a QoSC receives a NN_ADD_BW_REQ message, it may reply with the NN_ADD_BW_RSP message. The message indicates if the bandwidth request is accepted or not. An exemplary NN_ADD_BW_RSP message is shown in Table 19.

TABLE 19

MIBODY of NNET MPDU: NN_ADD_BW_RSP

| Field Name | Octet | BitNum | Bits | Definition |
|---|---|---|---|---|
| Type | 0 | 0-7 | 8 | Set to 6 to indicate NN_ADD_BW_RSP. |
| ReqID | 1 | 0-7 | 8 | Request ID. Copy directly from NN_ADD_BW_REQ. |
| SrcNID | 2 | 0-7 | 8 | NID of the sender. |
| Result | 3 | 0-7 | 8 | Set to 0 to mean NN_ADD_BW_REQ is accepted. Set to 1 to mean NN_ADD_BW_REQ is rejected because the proposed schedule is being reserved by another QoSC. Set to 2 to mean NN_ADD_BW_REQ is rejected because the resultant Contention Period remaining would become too short. |

The NN_ADD_BW_CFM message is sent by the source QoSC to all its neighbor QoSCs to confirm if the bandwidth request is successful or canceled. This message may be sent after the source QoSC has received all the NN_ADD_B-

W_RSP messages from its neighbors. An exemplary NN_ADD_BW_CFM message is shown in Table 20.

TABLE 20

MIBODY of NNET MPDU: NN_ADD_BW_CFM

| Field Name | Octet | BitNum | Bits | Definition |
|---|---|---|---|---|
| Type | 0 | 0-7 | 8 | Set to 7 to indicate NN_ADD_BW_CFM. |
| ReqID | 1 | 0-7 | 8 | Request ID. Copy directly from NN_ADD_BW_REQ. |
| SrcNID | 2 | 0-7 | 8 | NID of the sender. |
| Action | 3 | 0-7 | 8 | Set to 0 to mean the bandwidth request is successful. Set to 1 to mean the bandwidth request is canceled. |

The NN_REL_BW_IND message is sent by a QoSC to release part or all of its Contention-Free Period. The message contains the time intervals that are being released. The usage of any time interval that is not specified in the message may be left unchanged. In some embodiments, no response message is required. An exemplary NN_REL_BW_IND message is shown in Table 21.

TABLE 21

MIBODY of NNET MPDU: NN_REL_BW_IND (Coding 1)

| Field Name | Octet | BitNum | Bits | Definition |
|---|---|---|---|---|
| Type | 0 | 0-7 | 8 | Set to 8 to indicate NN_REL_BW_IND. |
| ReqID | 1 | 0-7 | 8 | Request ID. Set by sender so that the same value was not used "recently." |
| SrcNID | 2 | 0-7 | 8 | NID of the sender. |
| Coding (1) | 3 | 0 | 1 | Coding method in which schedules are specified. Must be set to 1. |
| NumSch |  | 1-7 | 7 | Number of schedules to follow. The sender is going to release each time interval. |
| Duration_1 | 4-5 | 0-7 | 16 | Duration of the first schedule, in micro-seconds. |
| StartTime_1 | 6-7 | 0-7 | 16 | Start time of the first schedule, in micro-seconds, relative to the end of the Beacon Region. |
| . |  |  |  |  |
| . |  |  |  |  |
| . |  |  |  |  |
| Duration_n | Variable | 0-7 | 16 | Duration of the $n^{th}$ schedule, in micro-seconds. |
| StartTime_n | Variable | 0-7 | 16 | Start time of the $n^{th}$ schedule, in micro-seconds, relative to the end of the Beacon Region. |

A NN_REL_NET_IND message is sent by a QoSC to release all its Contention-Free Period and to shutdown its network. No response message is required. An exemplary NN_REL_NET_IND message is shown in Table 22.

TABLE 22

MIBODY of NNET MPDU: NN_REL_NET_IND (Coding 1)

| Field Name | Octet | BitNum | Bits | Definition |
|---|---|---|---|---|
| Type | 0 | 0-7 | 8 | Set to 9 to indicate NN_REL_NET_IND. |
| ReqID | 1 | 0-7 | 8 | Request ID. Set by sender so that the same value was not used "recently." |
| SrcNID | 2 | 0-7 | 8 | NID of the sender. |
| SlotID | 3 | 0-7 | 8 | Slot number used by the sender to transmit the Beacons. |
| NumSlots | 4 | 0-7 | 8 | Number of slots in the sender's Beacon Region. |
| Coding (1) | 5 | 0 | 1 | Coding method in which schedules are specified. Must be set to 1. |
| NumSch |  | 1-7 | 7 | Number of schedules to follow. This is the list of time intervals which have been reserved by the sender. |
| Duration_1 | 6-7 | 0-7 | 16 | Duration of the first schedule, in micro-seconds. |
| StartTime_1 | 8-9 | 0-7 | 16 | Start time of the first schedule, in micro-seconds, relative to the end of the Beacon Region. |
| . |  |  |  |  |
| . |  |  |  |  |
| . |  |  |  |  |
| Duration_n | Variable | 0-7 | 16 | Duration of the $n^{th}$ schedule, in micro-seconds. |
| StartTime_n | Variable | 0-7 | 16 | Start time of the $n^{th}$ schedule, in micro-seconds, relative to the end of the Beacon Region. |

Discovery and Proxy Networking

To support device discovery, a Discover Beacon or a Discover message may be sent periodically. Embodiments of the present invention may send a Discover message (DISCOVER PDU) during the Contention-Free Period of a network.

In alternative embodiments, i.e. sending a Discover Beacon, coordination between neighbor QoSCs to schedule a slot in the Beacon Region for the Discover Beacon may be required. This approach may be less efficient compared with simply sending the DISCOVER PDU in the Contention-Free Period.

Changing the Duration of the Beacon Region

Messages are also required to change the parameters of the network, e.g. to change the NID, the slot number where the Beacon is transmitted, or the number of slots in the Beacon Region.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

We claim:

1. A method for distributed coordination of multiple interfering networks, said method comprising:
    a) establishing a network controlling authority for a network;
    b) searching for an interfering network;
    c) receiving an interfering network list (INL) for said interfering network, said INL comprising an identification of said interfering network when said interfering network is present;
    d) transmitting an INL for said network to said interfering network, said INL comprising identification of networks interfering with said network; and
    e) communicating with an interfering network controlling authority for said interfering network to allocate specific bandwidth segments for exclusive use by one of said interfering network and said network.

2. A method as described in claim 1 wherein said network controlling authority is a Quality of Service Controller (QoSC).

3. A method as described in claim 1 wherein said searching comprises listening for a Beacon Protocol Data Unit (PDU) from said interfering network.

4. A method as described in claim 1 wherein said INL for said network is created by compiling data from at least one Beacon Protocol Data Unit (PDU).

5. A method as described in claim 1 wherein said communicating comprises establishing a Contention Free Period (CFP) for exclusive use by one of said network or said interfering network.

6. A method for distributed coordination of a network, said method comprising:
    a) receiving a beacon from an interfering network controller (INC);
    b) requesting an interfering network list (INL) from said INC;
    c) selecting a network identification and a beacon slot that is not used in said INL; and
    d) coordinating communication with said INC.

7. A method for distributed coordination of multiple interfering networks, said method comprising:
    a) establishing a network controlling authority (NCA) for a network;
    b) performing a beacon detection process with said NCA to detect an interfering network;
    c) requesting, via said NCA, an interfering network list (INL) comprising an identification of an interfering network when said interfering network is present;
    d) receiving, via said NCA, said interfering network list (INL) when said interfering network is present;
    e) coordinating network communication with said interfering network to reduce interference-related transmission losses.

8. A method as described in claim 7 wherein said INL comprises beacon slot information and network identification information.

9. A method as described in claim 7 wherein said coordinating comprises establishing a contention-free period.

10. A method for distributed coordination of multiple interfering networks, said method comprising:
    a) establishing a first network controlling authority (NCA) for a first interfering network;
    b) establishing a second NCA for a second interfering network,
    c) receiving a beacon message at said second NCA from said first NCA
    d) requesting, via said second NCA, a first interfering network list (INL) for said first network;
    e) receiving, at said second NCA, said first INL;
    f) establishing a transmission schedule for said first and second interfering networks to reduce interference-related transmission losses.

11. A method as described in claim 10 wherein said establishing a transmission schedule comprises sending a new network request from said second NCA to said first NCA.

12. A method for distributed coordination of multiple interfering networks, said method comprising:
    a) establishing a first network controlling authority (NCA) for a first interfering network;
    b) establishing a second NCA for a second interfering network,
    c) receiving a beacon message at said second NCA from said first NCA
    d) requesting, via said second NCA, a first interfering network list (INL) for said first interfering network;
    e) receiving, at said second NCA, said first interfering network list (INL);
    f) establishing a transmission schedule for said first and second interfering networks to reduce interference-related transmission losses, wherein said establishing a transmission schedule comprises sending an add bandwidth request from said second NCA to said first NCA.

13. A method for distributed coordination of multiple interfering networks, said method comprising:
    a) establishing a first network controlling authority (NCA) for a first interfering network;
    b) establishing a second NCA for a second interfering network,
    c) receiving a beacon message at said second NCA from said first NCA
    d) requesting, via said second NCA, a first interfering network list (INL) for said first interfering network;
    e) receiving, at said second NCA, said first interfering network list (INL);
    f) establishing a transmission schedule for said first and second interfering networks to reduce interference-related transmission losses, wherein said establishing a transmission schedule comprises sending an add bandwidth request from said second NCA to said first NCA, sending an add bandwidth response from said first NCA to said second NCA and sending an add bandwidth confirmation from said second NCA to said first NCA.

14. A method for distributed coordination of multiple interfering networks, said method comprising:
   a) establishing a first network controlling authority (NCA) for a first interfering network;
   b) establishing a second NCA for a second interfering network,
   c) receiving a beacon message at said second NCA from said first NCA
   d) requesting, via said second NCA, a first interfering network list (INL) for said first interfering network;
   e) receiving, at said second NCA, said first interfering network list (INL);
   f) establishing a transmission schedule for said first and second interfering networks to reduce interference-related transmission losses, wherein said establishing a transmission schedule comprises sending a new network request from said second NCA to said first NCA, sending a new network response from said first NCA to said second NCA and sending a new network confirmation from said second NCA to said first NCA.

* * * * *